United States Patent
Bastide et al.

(10) Patent No.: US 9,947,037 B2
(45) Date of Patent: Apr. 17, 2018

(54) SOFTWARE RECOMMENDATION SERVICES FOR TARGETED USER GROUPS

(71) Applicant: INTERNATIONAL BUSINESS MACHINES CORPORATION, Armonk, NY (US)

(72) Inventors: Paul R. Bastide, Boxford, MA (US); King Shing K. Lui, Unionville (CA); Leho Nigul, Richmond Hill (CA); Dana L. Price, Surf City, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/265,290

(22) Filed: Sep. 14, 2016

(65) Prior Publication Data

US 2018/0075513 A1    Mar. 15, 2018

(51) Int. Cl.
*G06Q 30/00* (2012.01)
*G06Q 30/06* (2012.01)
*H04L 29/08* (2006.01)
*G06Q 50/00* (2012.01)

(52) U.S. Cl.
CPC ......... *G06Q 30/0631* (2013.01); *H04L 67/22* (2013.01); *G06Q 50/01* (2013.01)

(58) Field of Classification Search
CPC .................................................. G06Q 30/0631
USPC ....................................................... 705/26, 27
See application file for complete search history.

(56) References Cited

U.S. PATENT DOCUMENTS

| | | | |
|---|---|---|---|
| 8,849,721 B2* | 9/2014 | Fedorov | G06Q 10/101 705/319 |
| 9,148,399 B1 | 9/2015 | Sadovsky et al. | |
| 2011/0231240 A1* | 9/2011 | Schoen | G06Q 30/0242 705/14.41 |
| 2012/0072283 A1 | 3/2012 | DeVore et al. | |
| 2012/0194851 A1 | 8/2012 | Srinivasmurthy et al. | |
| 2013/0073632 A1* | 3/2013 | Fedorov | G06Q 10/101 709/205 |
| 2013/0185292 A1 | 7/2013 | Li et al. | |
| 2014/0052542 A1 | 2/2014 | Zhang et al. | |
| 2014/0052683 A1* | 2/2014 | Kirkham | G06Q 30/0631 706/46 |

(Continued)

FOREIGN PATENT DOCUMENTS

CA    104240105 A    12/2014

OTHER PUBLICATIONS

Kuhikar, Pravin: Facebook Marketing Using Facebook Pages For Indian Marketer: An Overview, PRIMA 4.1. Publishing India Group. (2013); ProQuest Dialog 9pgs.*

*Primary Examiner* — Robert M Pond
(74) *Attorney, Agent, or Firm* — Tutunjian & Bitetto, P.C.; Scott S. Dobson

(57) ABSTRACT

Computer-implemented methods and systems are provided for recommending one or more applications to users connected to one or more social networks. The computer-implemented method may include determining frequency of interaction between the users connected to the one or more social networks, analyzing behavioral patterns of the users connected to the one or more social networks, the behavioral patterns derived by considering at least the frequency of interaction between the users, and enabling at least one service provider to recommend one or more applications to one or more of the users based on the monitored behavioral patterns.

20 Claims, 9 Drawing Sheets

(56) References Cited

U.S. PATENT DOCUMENTS

| | | | | |
|---|---|---|---|---|
| 2014/0244745 A1* | 8/2014 | Murarka | ................ | H04L 67/22 |
| | | | | 709/204 |
| 2014/0244762 A1* | 8/2014 | Wyndowe | ............... | H04L 67/10 |
| | | | | 709/205 |
| 2015/0106801 A1* | 4/2015 | Agrawal | ................... | G06F 8/60 |
| | | | | 717/177 |
| 2016/0171385 A1* | 6/2016 | Gross | .................... | H04L 67/306 |
| | | | | 706/12 |
| 2016/0171589 A1* | 6/2016 | Glover | ............... | G06Q 30/0631 |
| | | | | 705/26.7 |

* cited by examiner

SOFTWARE RECOMMENDATION SERVICES FOR TARGETED USER GROUPS

BACKGROUND

Technical Field

The present invention relates generally to application recommendation engines, and more specifically, to systems and methods for recommending software applications to users connected to one or more social networks.

Description of the Related Art

The Internet has redefined how consumers and businesses interact with each other, providing instant access for consumers to online purchasing, and creating a unique marketing and distribution channel for businesses to reach their audiences. Businesses have been able to increase the effectiveness of targeting customers through the Web.

E-commerce has empowered consumers with the ability to obtain information on anything for sale online, at any time, from hundreds of millions of contributors around the world. Existing recommendation systems in online e-commerce portals allow users to research and create recommendations on items and services for sale, restaurants, locations, etc. Another type of application on the Internet that has recently grown in popularity is the social network. Social networks allow individuals to connect with others through a mapping of relationships, whether they are representations of personal friendships, business relationships, common interests, or other relationships. Social networks have attempted to incorporate e-commerce functionality through targeted and non-targeted advertising systems.

SUMMARY

In accordance with one embodiment of the present principles, a computer-implemented method for recommending one or more applications to users connected to one or more social networks is provided. The computer-implemented method includes determining frequency of interaction between the users connected to the one or more social networks. The computer-implemented method further includes analyzing behavioral patterns of the users connected to the one or more social networks, the behavioral patterns derived by considering at least the frequency of interaction between the users. The computer-implemented method further includes enabling at least one service provider to recommend one or more applications to one or more of the users based on the monitored behavioral patterns.

In accordance with another embodiment of the present principles, a system for recommending one or more applications to users connected to one or more social networks is provided. The system includes a memory and a processor in communication with the memory, wherein the computer system is configured to determine frequency of interaction between the users connected to the one or more social networks, analyze behavioral patterns of the users connected to the one or more social networks, the behavioral patterns derived by considering at least the frequency of interaction between the users, and enable at least one service provider to recommend one or more applications to one or more of the users based on the monitored behavioral patterns.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

Figure 1:
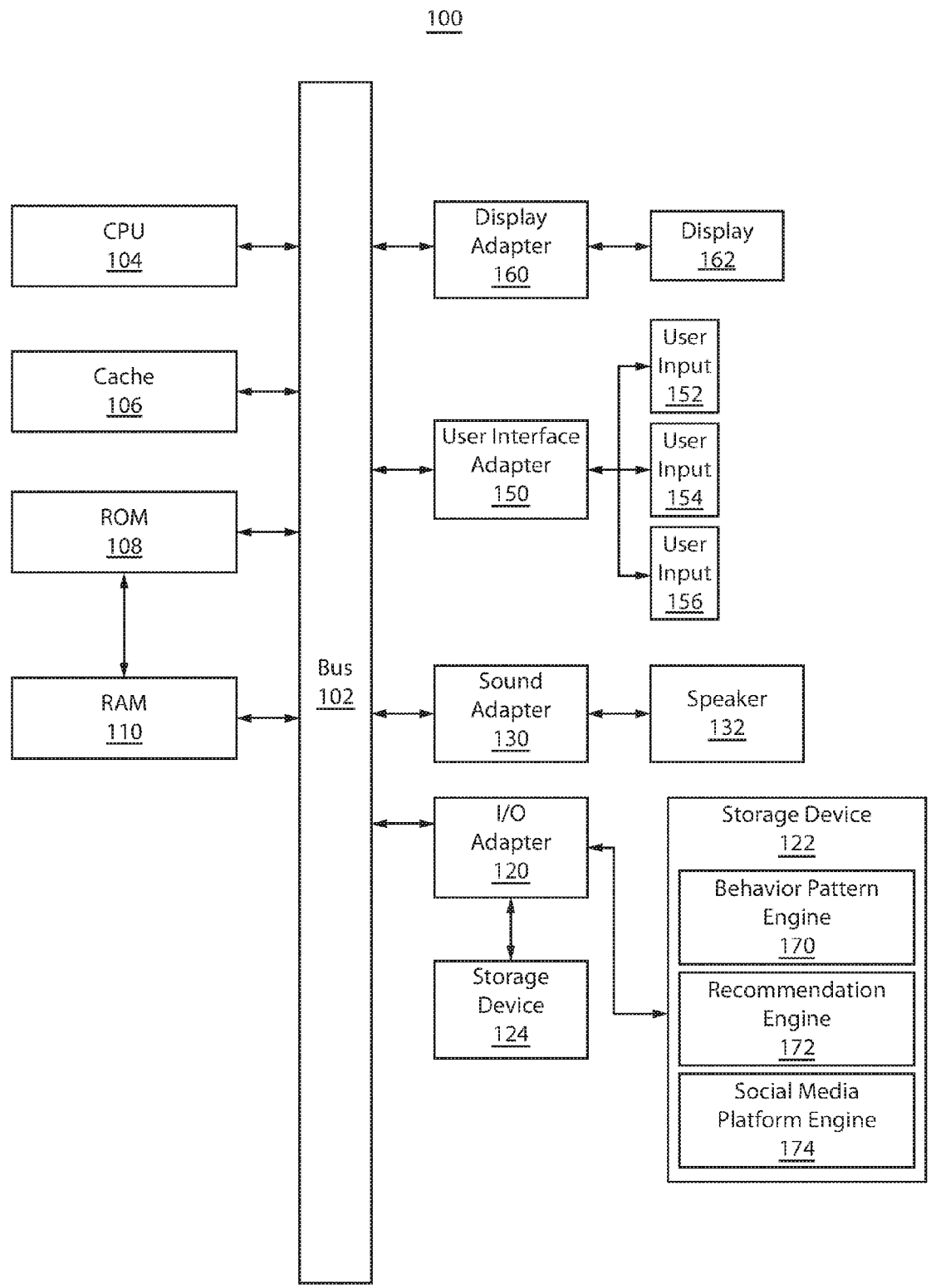
FIG. 1 is a block/flow diagram of an exemplary computing system for recommending software applications to users connected to one or more social networks, in accordance with an embodiment of the present principles.

The present principles are directed to systems and methods for recommending software applications to a plurality of users connected to, e.g., one or more social networks. In some embodiments, the present principles provide systems, methods and computer program products for dynamically recommending software services and/or applications along with ratings/reviews to a target user or target user groups by analyzing behavioral patterns of users within groups (e.g., close friends, managers, testers, developers, architects and project managers) active on, e.g., a social media platform.

In one or more embodiments, the present principles provide systems, methods and computer program products for utilizing an analyzing engine to monitor, analyze, and store user interactions/behaviors (e.g., frequency of interaction, software previously used, group and community joined by the user, etc.) associated with a group/friend on, e.g., the social media platform, and recommending the software/application to the user along with ratings/reviews of the software. The software application recommendations may thus be personalized or customized or tailored recommendations that are provided to a targeted user or user group.

In one or more embodiments, the present principles provide systems, methods and computer program products for recommending software and providing a rating of the software to an individual user that may have an interest in the software based on analysis of activities from multiple sources. These sources may include, e.g., an individual user's behavioral pattern and association with or within a virtual user group. For example, there may be virtual groups of manager, tester, developer, architect or project manager. The analysis engine then recommends the common software of a specific dedicated group to an individual user. Another source includes user's close friend's behavioral patterns. The engine recognizes the closest friends of an individual user (based on, e.g., frequency of interaction), and then recommends the software used by the closest friends to an individual user. Another source includes communities that the user joins, and the common software that is used by the specific community. Another source includes software behavioral pattern recognition. The analysis engine recommends software to a new user based on the software behavioral pattern of existing users.

In one or more embodiments, the present principles provide systems, methods and computer program products for allowing service providers, such as software vendors, to promote or market or offer for sale their software to target users or user groups. In one or more embodiments, the focus is on common user roles (not exclusively $1^{st}$ degree of association) and the user behavior associated with those roles, the application, and related applications in order to provide targeted software application recommendations. Thus, an analysis is performed of the users roles and activities and actions, as well as user interactions with a given software application and frequency of interaction between users.

In one or more embodiments, users access one or more social media platforms and behavioral patterns of users are analyzed based on several factors, such as, e.g., frequency of interaction between users, groups and communities joined by the users, and software applications previously used or downloaded or accessed by the users. The plurality of service providers (such as software vendors) access the behavioral patterns of the users and associate the behavioral patterns of the users to ratings of one or more applications provided by the plurality of service providers. The plurality of service providers provide recommendations of one or more applications to the users, as well as ratings and reviews of the recommended applications. The social media platform may also create one or more profiles for each user connected to one or more social media networks and continuously or periodically update such profiles. Feedback may be provided to the service providers based on the created user profiles.

Referring now to the drawings in which like numerals represent the same or similar elements and initially to FIG. 1, a block/flow diagram of an exemplary computing system for recommending software applications is presented, in accordance with an embodiment of the present principles.

An exemplary application recommendation processing system 100 to which the present principles may be applied is shown in accordance with one embodiment. The application recommendation processing system 100 includes at least one processor (CPU) 104 operatively coupled to other components via a system bus 102. A cache 106, a Read Only Memory (ROM) 108, a Random Access Memory (RAM) 110, an input/output (I/O) adapter 130, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. The I/O adapter 120 further communicates with a behavior pattern engine 170, a recommendation engine 172, and a social media platform engine 174.

The behavior pattern engine 170, the recommendation engine 172, and the social media platform engine 174 may be associated with the storage device 122. Such devices 170, 172, 174 need not be incorporated within the storage device 122. Such devices 170, 172, 174 may be external to the storage device 122. One skilled in the art may contemplate different system and networking configurations for incorporating the devices 170, 172, 174 therein.

A speaker 132 is operatively coupled to system bus 102 by the sound adapter 130. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from the application recommendation processing system 100.

Of course, the application recommendation processing system 100 may also include other elements (not shown), as readily contemplated by one of skill in the art, as well as omit certain elements. For example, various other input devices and/or output devices can be included in the application recommendation processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the application recommendation processing system 100 are readily contemplated by one of ordinary skill in the art given the teachings of the present principles provided herein.

Figure 2:
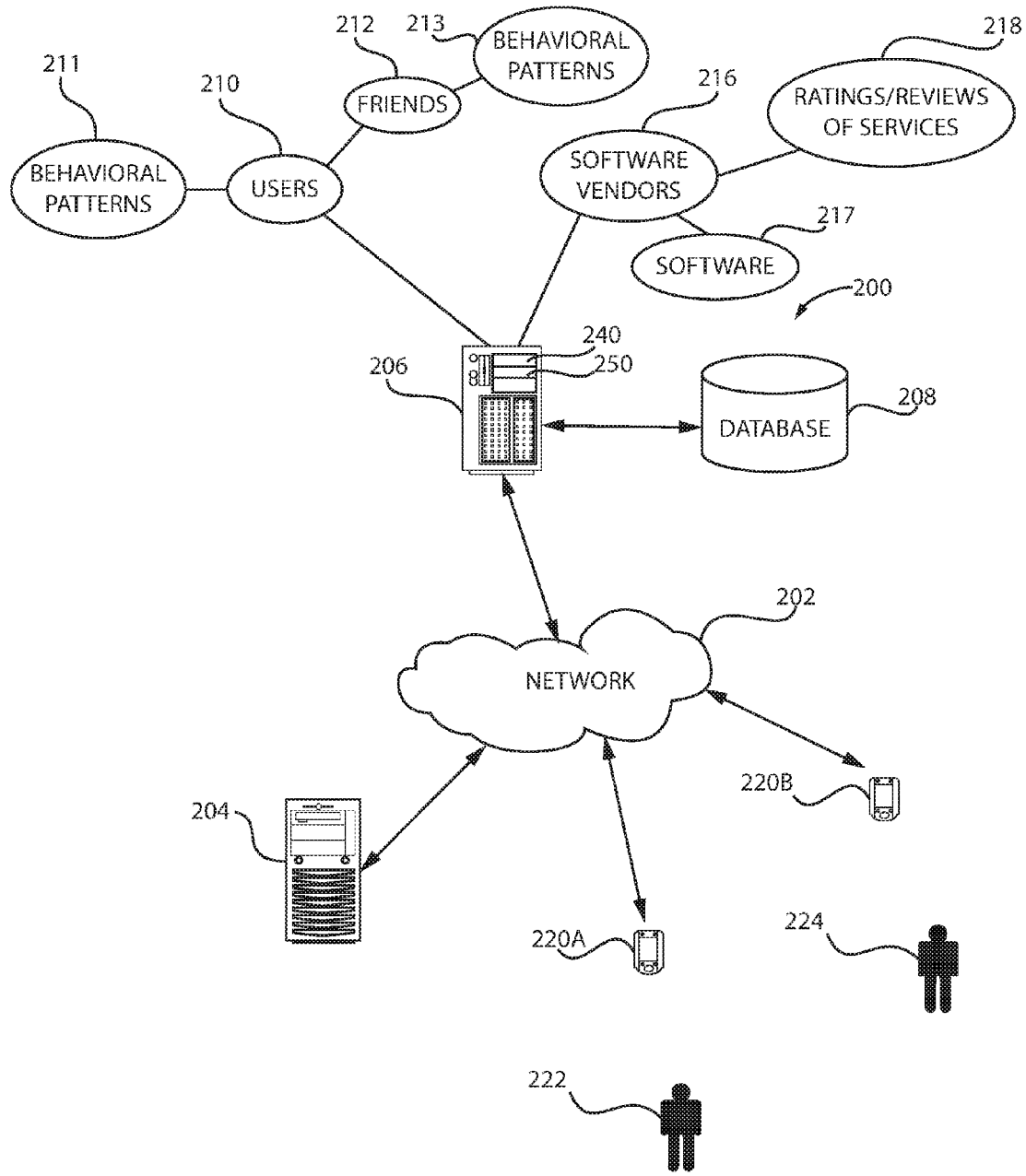
FIG. 2 is a block/flow diagram of an exemplary application recommendation system, in accordance with an embodiment of the present principles.

FIG. 2 is a block/flow diagram of an exemplary application recommendation system, in accordance with an embodiment of the present principles.

In application recommendation system 200, recommendations server 206 collects data from several mobile application devices 220A-B (operated by users 222, 224 respectively), as well as content publisher 204 via network 202. Collected data is stored in database 208. In some embodiments, database 208 may also store other information related to user accounts and/or devices. In some embodiments, recommendations server 206 may communicate with database 208 via network 202, a storage area network ("SAN"), a high-speed serial bus, and/or via other suitable communication technology. In some embodiments, other servers and/or devices (not shown) may also be present. For example, in many embodiments, multiple additional mobile application devices and/or non-mobile application devices may be present. Similarly, in many embodiments, multiple content publishers may also be present. In some embodiments, one or more intermediary application servers and/or platform-provider servers may also be present.

Recommendations server 206 includes a network interface for connecting to the network 202. Recommendations server 206 also includes a processing unit 240, a memory 250, and an optional display (not shown), all interconnected along with the network interface via bus 102 (FIG. 1). The memory 250 generally comprises a random access memory ("RAM"), a read only memory ("ROM"), and a permanent mass storage device, such as a disk drive. The memory 250 may also store an operating system (OS). These and other such software components may be loaded from a computer readable storage medium into memory 250 of the recommendations server 206 using a drive mechanism (not shown) associated with a non-transient computer readable storage medium, such as a floppy disc, tape, DVD/CD-ROM drive, memory card, or the like. In some embodiments, software components may also be loaded via the network interface, rather than via a computer readable storage medium.

A plurality of users 210 may be connected to the network 202 via the recommendations server 206. The network 202 may be, e.g., a social network. Behavioral patterns 211 of the users 210 may be derived and provided to the recommendations server 206. Additionally, the users 210 may be linked to, e.g., friends 212. The behavioral patterns 213 of the friends 212 of the users 210 may also be derived and provided to the recommendations server 206. Additionally, a plurality of service providers, e.g., software vendors 216 may also communicate with the recommendations server 206. The software vendors 216 may provide recommended software 217 and ratings/reviews 218 of the recommended software 217 to the users 210 via the recommendations server 206.

Figure 3:
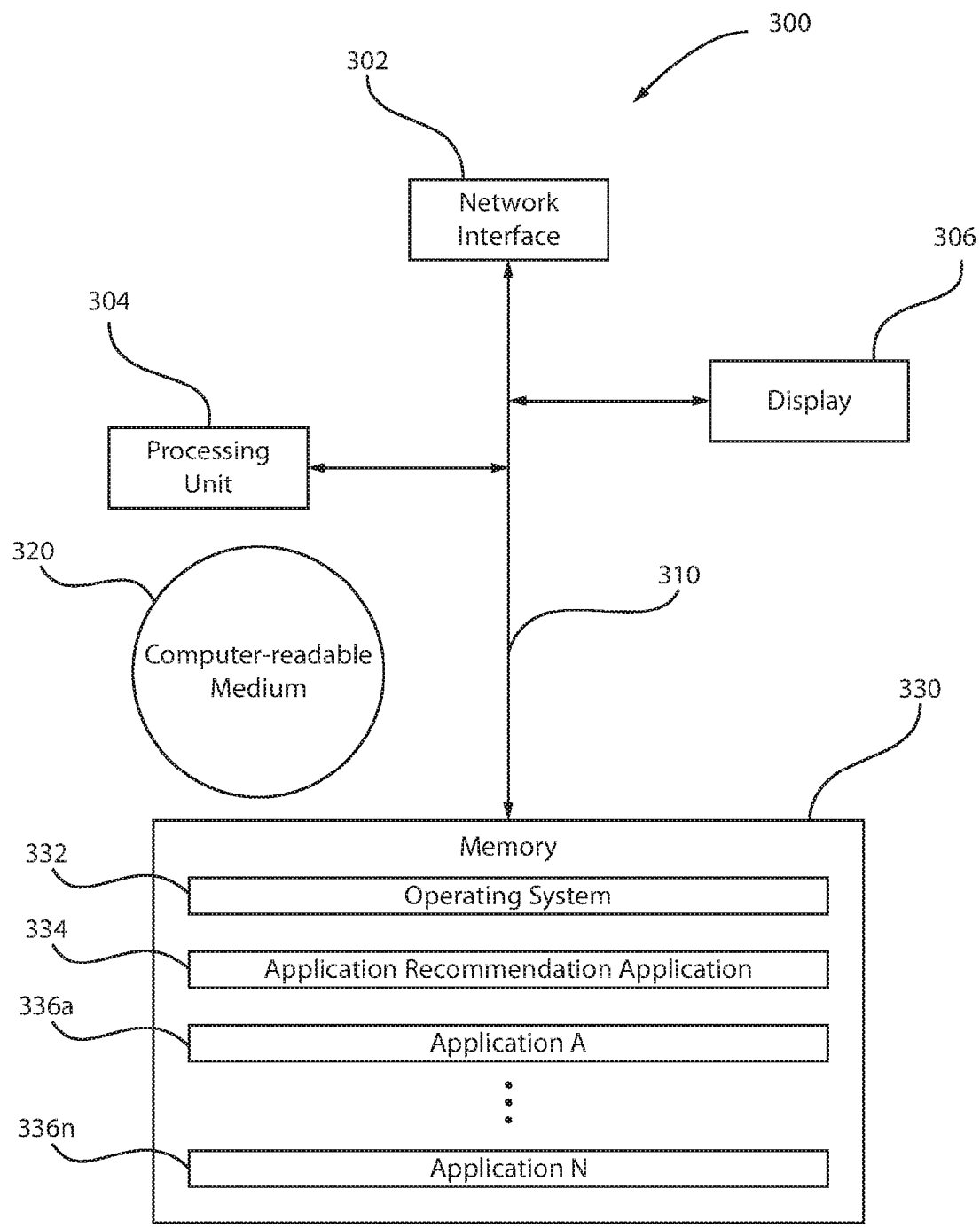
FIG. 3 is a block/flow diagram of an exemplary mobile application device, in accordance with an embodiment of the present principles.

FIG. 3 is a block/flow diagram of an exemplary mobile application device, in accordance with an embodiment of the present principles.

The mobile application device 300 includes a network interface 302 for connecting to the network 202 (FIG. 2). The mobile application device 300 also includes a processing unit 304, a memory 330, and a display interface 306, all interconnected along with the network interface 302 via bus 310. The memory 330 generally comprises a random access memory ("RAM"), a read only memory ("ROM"), and a permanent mass storage device, such as a disk drive, flash device, or the like. The memory 330 stores program code for an application-recommendation application 334, and several additional applications 336A-N. In addition, the memory 330 also stores an operating system 332. These software components may be loaded from a computer readable storage medium 320 into memory 330 of the mobile application device 300 using a read mechanism (not shown) associated with a non-transient computer readable storage medium 320, such as a floppy disc, tape, DVD/CD-ROM drive, memory card, or the like. In some embodiments, software components may also be loaded via the network interface 302, rather than via a computer readable storage medium 320.

Although an exemplary mobile application device 300 has been described that generally conforms to conventional general purpose computing devices, a mobile application device 300 may be any of a great number of mobile devices capable of communicating with the network 202 (FIG. 2) and obtaining applications, for example, a personal game console, a handheld computer, a cell phone, or any other suitable mobile device. In some embodiments, some or all of the systems and methods disclosed herein may also be applicable to non-mobile devices, such as a personal computer, a set-top box, and the like.

Figure 4:
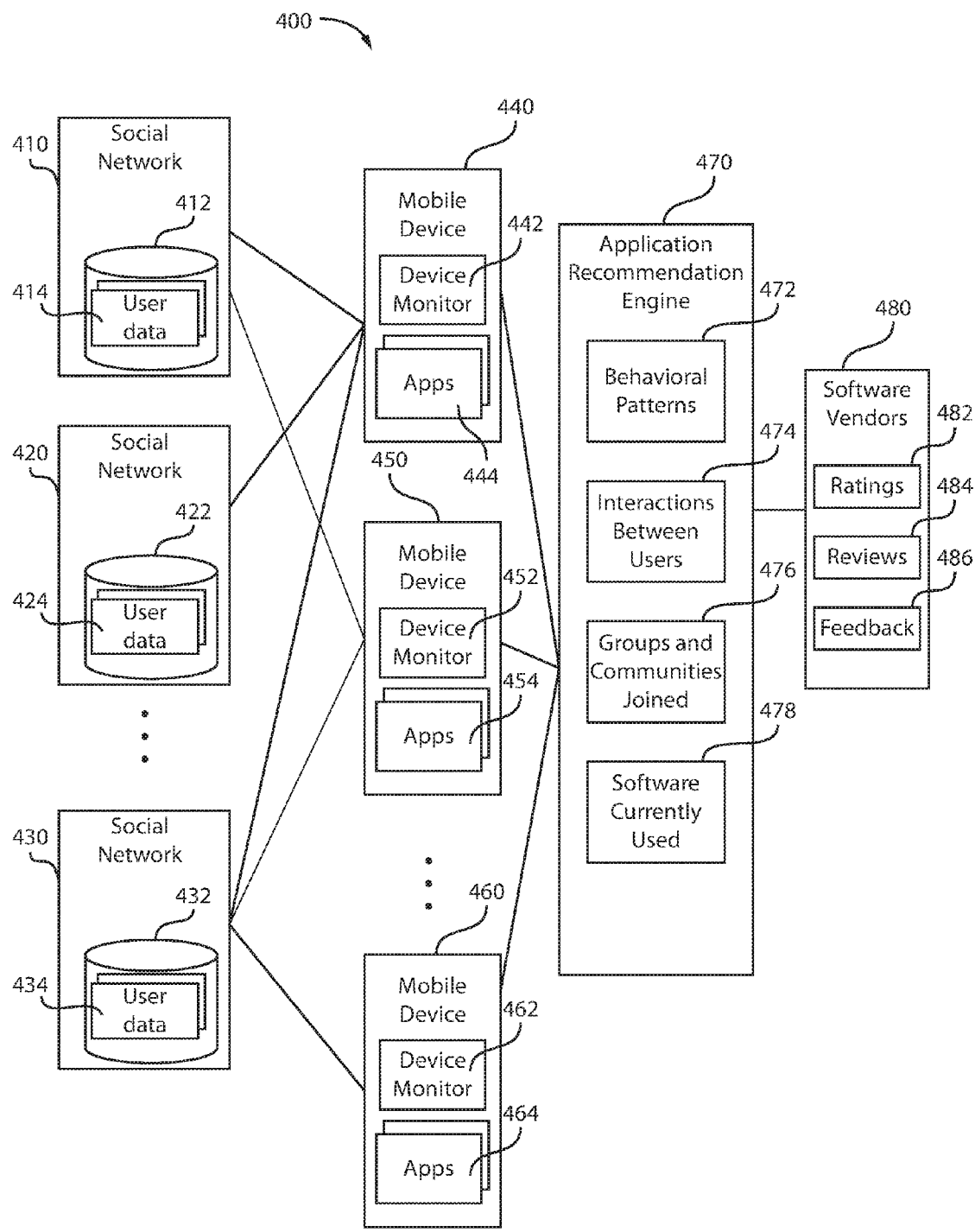
FIG. 4 is a block/flow diagram of an exemplary system for collecting mobile device usage data and behavioral patterns, in accordance with an embodiment of the present principles.

FIG. 4 is a block/flow diagram of an exemplary system for collecting mobile device usage data and behavioral patterns, in accordance with an embodiment of the present principles.

The application recommendation engine 470 may include a number of subcomponents. Such subcomponents may include behavioral patterns 472, interactions between users 474, groups and communities joined 476, and software currently used 478. As shown, the application recommendation engine 470 may communicate with multiple mobile devices 440, 450, 460. Communication between the application recommendation engine 470 and the mobile devices 440, 450, 460 may occur over various types of wired and wireless electronic communication media using various types of wired and wireless communication protocols.

Each of the mobile devices 440, 450, 460 may include a device monitor 442, 452, 462, respectively, as well as one or more applications 444, 454, 464, respectively. The device monitors 442, 452, 462 may be a standalone or plug-in application executed on one or more processors in the mobile devices 440, 450, 460. The device monitors 442, 452, 462 may monitor various pieces of information regarding the use of the mobile devices 440, 450, 460 and the users associated with mobile devices 440, 450, 460, and compile information into mobile devices 440, 450, 460 usage data that may be shared with or sent to the application recommendation engine 470.

For example, the device monitors 442, 452, 462 may monitor various functions of the applications 444, 454, 464 and user behavior or interactions with the mobile devices 440, 450, 460 and include such information in the mobile device usage data. The device monitors 442, 452, 462 may also collect application usage data, search behavior data, social network behavior data, and social network connection data. For example, the device monitors 442, 452, 462 may monitor the frequency with which each of the applications 444, 454, 464 are used and the duration of each use of applications 444, 454, 464. Additionally, the device monitors 442, 452, 462 may monitor user input that the users of mobile devices 440, 450, 460 enter into applications 444, 454, 464 or other functionality of mobile devices 440, 450, 460. All such information may be included in the mobile device usage data.

In particular, device monitors 442, 452, 462 may access user logon credentials, e.g., username and password combinations, the user of a particular mobile device 440, 450, 460 that enters into a specific application 444, 454, 464 to access one or more social networks 410, 420, 430. With or without the user's consent, the device monitors 442, 452, 462 may use the user's logon credentials to access the various social networks 410, 420, 430 to download, analyze, or search user data 414, 424, 434 associated with the particular user and stored in databases 412, 422, 432, respectively. Such user data 414, 424, 434 may include, e.g., contact information, social connection information, user characteristic information, application ratings, application preferences, and application ratings and preferences associated with other users associated to the user within the social networks 410, 420, 430. Any and all data determined from user data 414, 424, 434 by the device monitors 442, 452, 462 may be saved and/or sent to the application recommendation engine 470. Device monitors 442, 452, 462 may also access information in the one or more social networks 410, 420, 430 without using social network specific user credentials. For example, device monitors 442, 452, 462 may user various types of on-behalf authorization mechanisms to access users' public social network information without obtaining or storing the social network specific logon credentials, e.g., username/password pairs.

The application recommendation engine 470 further communicates with service providers, such as software vendors 480. Software vendors 480 may provide recommended software to the users of the mobile devices 440, 450, 460, including ratings 482 and reviews 484 of the recommended software. The software vendors 480 may also have access to a feedback module or unit 486 to receive feedback, e.g., regarding user profiles created by collecting information/data related to behavioral patterns of the users of the mobile devices 440, 450, 460. The software vendors 480 process or evaluate or analyze or review the information received from the application recommendation engine 470 in order to make personalized or customized recommendations tailored to a target user or to targeted user groups.

Figure 5:
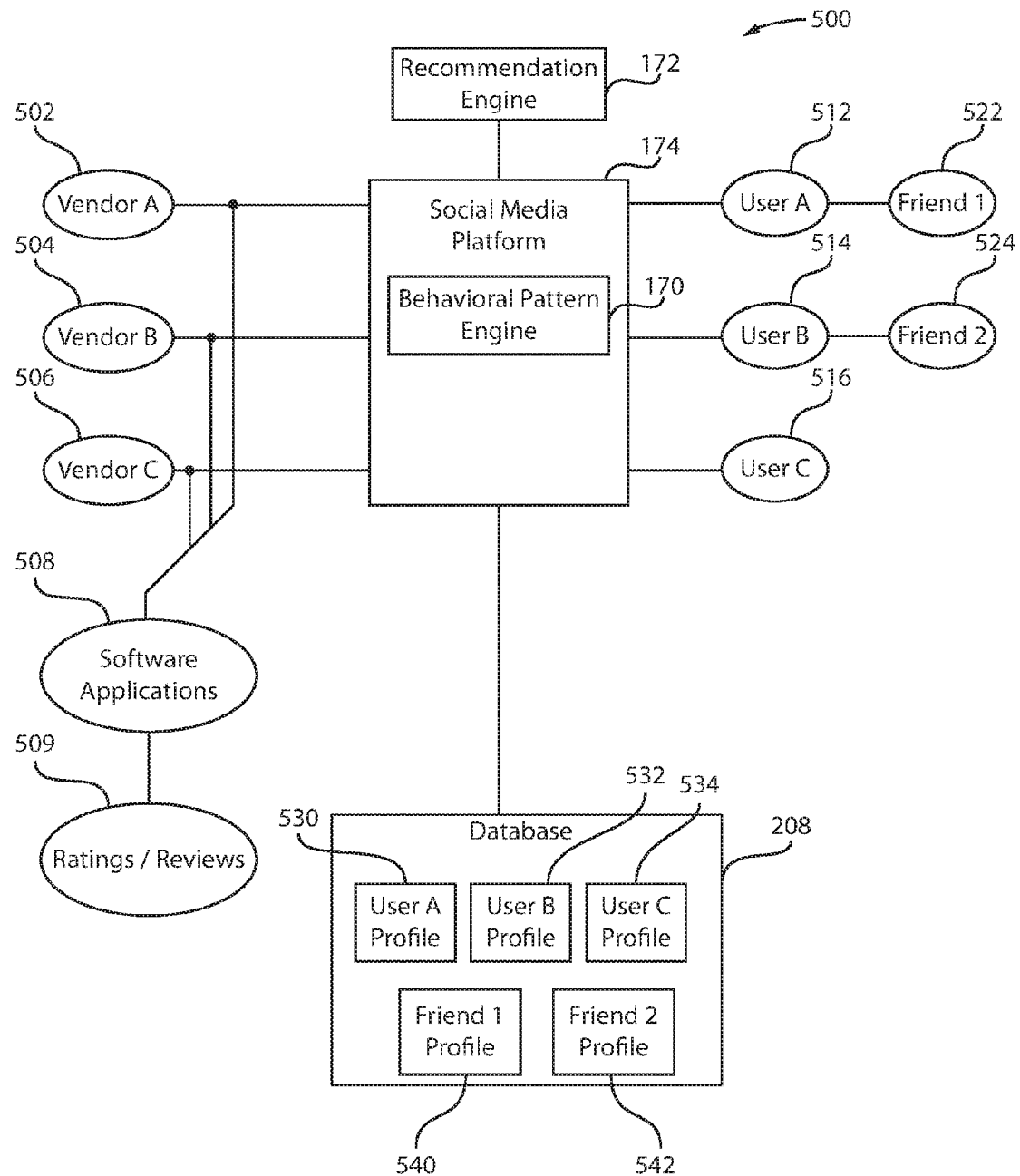
FIG. 5 is a block/flow diagram of an exemplary system for enabling service providers to recommend one or more applications to users of one or more social networks, in accordance with an embodiment of the present principles.

FIG. 5 is a block/flow diagram of an exemplary system for enabling service providers to recommend one or more applications to users of one or more social networks, in accordance with an embodiment of the present principles.

The system 500 includes a social media platform 174 that executes a behavioral pattern engine 170. The behavioral pattern engine 170 may be incorporated within the social media platform 174. However, it is contemplated that the behavioral pattern engine 170 is separate and distinct from the social media platform 174. A first user 512, a second user 514, and a third user 516 access the social media platform 174. The first user 512 may be connected to a friend 522 and the second user 514 may be connected to a friend 524.

A recommendation engine 172 may also be connected to the social media platform 174. The recommendation engine 172 is configured to make recommendations to the first, second, and third users 512, 514, 516. The recommendations are prompted or instigated or enabled by the first vendor 502, the second vendor 504, and the third vendor 506. The first, second, and third vendors 502, 504, 506 may provide, e.g., software recommendations or software application recommendations 508 to the first, second, and third users 512, 514, 516 connected to the social media platform 174. The first, second, and third vendors 502, 504, 506 may further provide, e.g., rating and/or reviews 509 of the software applications 508. These recommendations and reviews and ratings are provided to the first, second, and third users 512, 514, 516 based on the behavioral patterns of the users derived from the behavioral pattern engine 170. One skilled in the art may contemplate a plurality of different behavioral patterns derived from a plurality of different behavioral pattern techniques discussed in detail below.

The social media platform 174 may also be connected to a database 208. The database 208 may be used to store profiles of the first, second, and third users 512, 514, 516, as well as profiles of the friends 522, 524 of the users 512, 514. For example, since three (3) users 512, 514, 516 are connected to the social media platform 174 and two (2) friends 522, 524 are connected to users 512, 514, user profiles of such individuals may be stored in the database 208. Thus, the database 208 shows a first user profile 530 created for the first user 512, a second user profile 532 created for the second user 514, and a third user profile 534 created for the third user 516. Additionally, a first friend profile 540 may be created for the first user 512 and a second friend profile 542 may be created for the second user 514. Each user may have one profile created or derived or extracted from the behavioral pattern engine 170. However, it is contemplated that each user may have several profiles created or derived or extracted from the behavioral pattern engine 170.

In one or more embodiments, the user profiles 530, 532, 534 may be continuously or periodically updated as new information is received by the behavioral pattern engine 170. For instance, the first user 512 may download new applications or join new groups, thus prompting the modification of the first user profile 530. This modification may occur in real-time. The user profiles 530, 532, 534 are composed or formed based on behavioral patterns of the users 512, 514, 516, which may include an analysis of the users' activities and roles (not just the installation of a specific software program). Therefore, the user profiles 530, 532, 534 are built or constructed or created or developed or organized based on, e.g., interactions of a user with other users within, e.g., one or more social networks, frequency of interaction of the user with other users within, e.g., the one or more social networks, communities or groups joined by the user, behavioral patterns of friends of the user, associations of the user with other user groups, and actions taken when using previous software applications downloaded/installed or accessed by the user.

In one or more embodiments, the frequency of interaction enables vendors to extract valuable data. For instance, if a user is an engineer and frequently interacts with two individuals/users that are patent lawyers, the frequency of interaction may indicate that the user is in the process of filing, e.g., a patent. Based on this parameter or variable, the vendors may recommend certain software applications to the user related to patent law, filing patents, writing patent applications, etc. Thus, the software application recommendations are personalized or customized or targeted to the user's interests or activities or actions or roles.

In another example embodiment, the user may have a dozen friends that have read a certain business book. The user may be an investment banker and at least half his friends may be investment bankers. Based on this parameter or variable, and the frequency of interaction between the users and his/her friends, the vendors may recommend certain software applications to the user related to downloading that certain business book read by all the user's friends. Thus, the software application recommendations are personalized or customized or targeted to the user's interests or activities or actions or roles.

In one or more embodiments, the vendors 502, 504, 506 have access to the user profiles 530, 532, 534. The vendors 502, 504, 506 analyze or examine or review or inspect the user profiles 530, 532, 534 to determine what software applications 508 the users 512, 514, 516 may be interested in. Thus, the user profiles 530, 532, 534 aid the vendors 502, 504, 506 in making software application recommendations to the users 512, 514, 516. It is contemplated that only a portion of the user profiles 530, 532, 534 are provided to the vendors 502, 504, 506. Thus, a portion of the data/information within the user profiles 530, 532, 534 may remain private or confidential. It is contemplated that the users 512, 514, 516 may control which portions of the data/information within the profiles 530, 532, 534 are accessible or not accessible to the vendors 502, 504, 506. For example, a user may be looking for a new job, and, thus, the user accesses several job-related websites and uploads his/her resume to such sites. The user may wish for such information to be confidential or private, and, thus, the user may not desire any type of recommendations to be made with regard to this topic. As a result, certain aspects of the user profile may be blocked from vendors. The user may have the capability or power to specify which topics or actions or activities or roles are off limits to vendors. Thus, software application recommendations may be made only regarding pre-approved topics or actions taken by the user.

Figure 6:
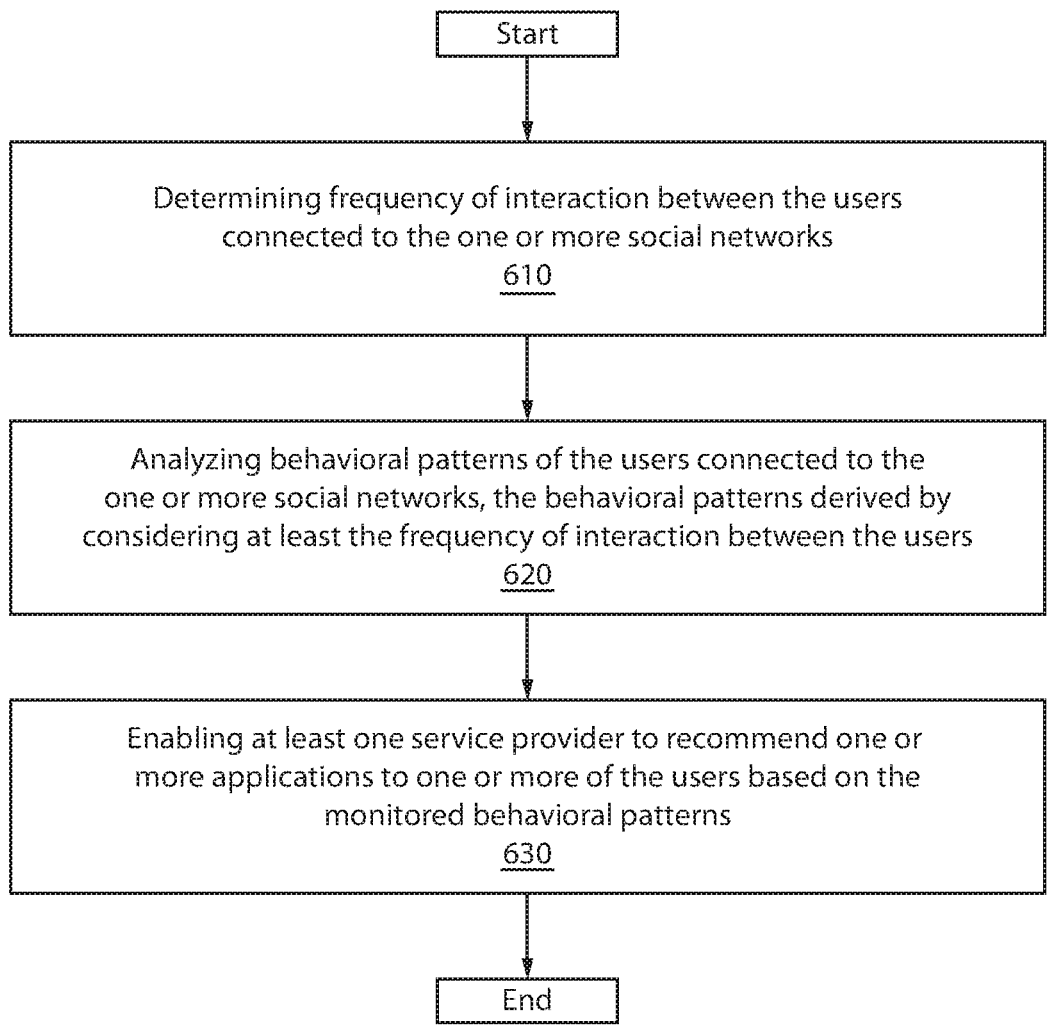
FIG. 6 is a block/flow diagram of an exemplary method for recommending one or more applications to users, in accordance with an embodiment of the present principles.

FIG. 6 is a block/flow diagram of an exemplary method for recommending one or more applications to users, in accordance with an embodiment of the present principles.

At block 610, frequency of interaction between the users connected to the one or more social networks is determined.

At block 620, behavioral patterns of the users connected to the one or more social networks are analyzed, the behavioral patterns derived by considering at least the frequency of interaction between the users.

At block 630, at least one service provider is enabled to recommend one or more applications to one or more of the users based on the monitored behavioral patterns.

Figure 7:
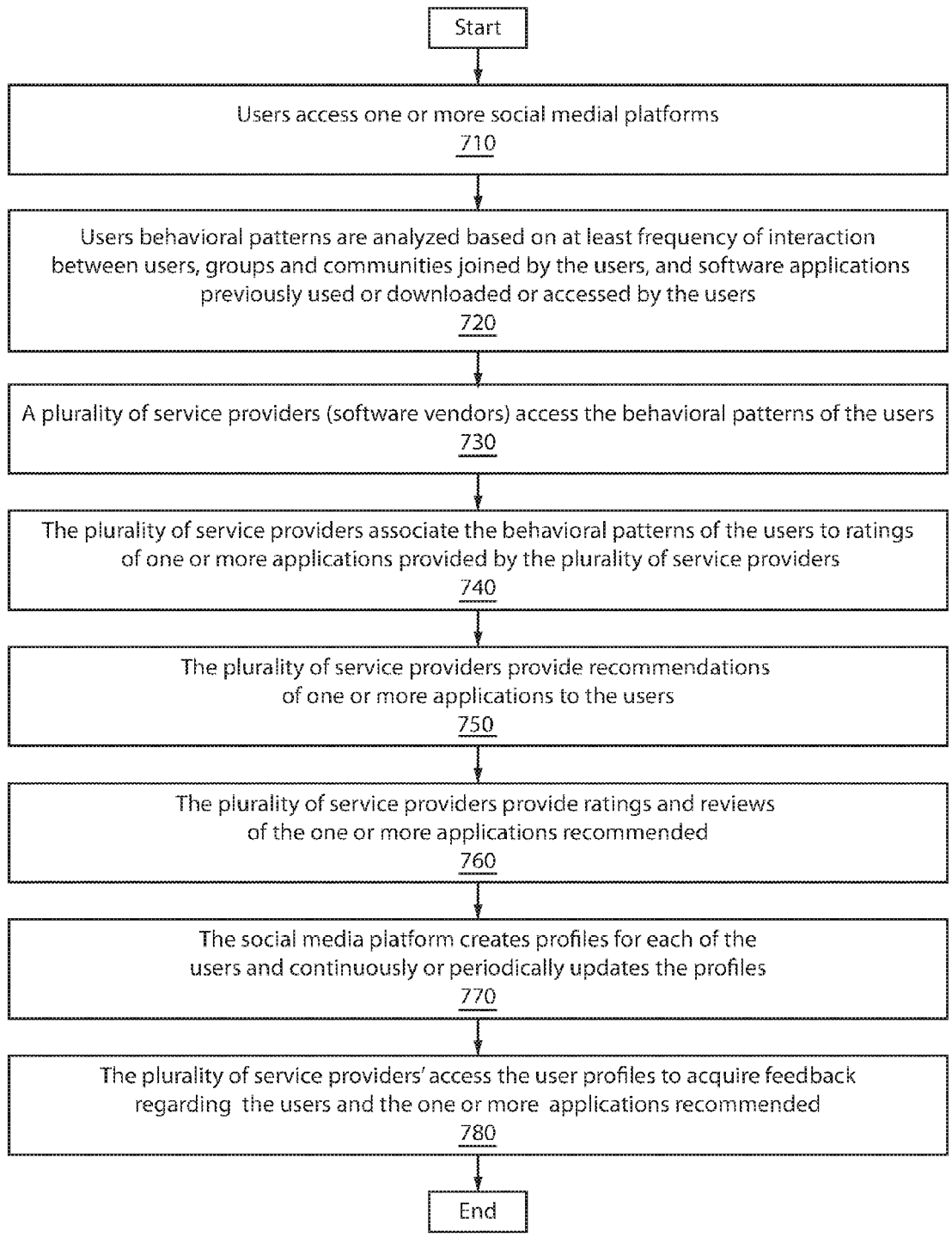
FIG. 7 is a block/flow diagram of an exemplary method for enabling service providers to recommend one or more applications to users of one or more social networks, in accordance with an embodiment of the present principles.

FIG. 7 is a block/flow diagram of an exemplary method for enabling service providers to recommend one or more applications to users of one or more social networks, in accordance with an embodiment of the present principles.

At block 710, users access one or more social media platforms.

At block 720, behavioral patterns of users are analyzed based on at least frequency of interaction between users, groups and communities joined by the users, and software applications previously used or downloaded or accessed by the users.

At block 730, a plurality of service providers (software vendors) access the behavioral patterns of the users.

At block 740, the plurality of service providers associate the behavioral patterns of the users to ratings of one or more applications provided by the plurality of service providers.

At block 750, the plurality of service providers provide recommendations of one or more applications to the users.

At block 760, the plurality of service providers provide ratings and reviews of the one or more applications recommended.

At block 770, the social media platform creates profiles for each of the users and continuously or periodically updates the profiles.

At block 780, the plurality of service providers' access the user profiles to acquire feedback regarding the users and the one or more applications recommended.

In one or more embodiments, the software application recommendations advanced by the vendors to the users of one or more social networks are user-specific recommendations and depend or are based on the user's own activities and actions and roles. Thus, the recommendations are not based on what other users have downloaded/installed or which applications are highly rated by websites. Instead, the software application recommendations are tailored or customized or personalized for each user based on, e.g., the user's behavioral patterns. Stated differently, mining of user behavioral patterns directs vendors in deciding which software applications to recommend to the user. Some data or information used may be clickstream data. Each clickstream may represent a corresponding sequence of user actions. These sequence of actions may be analyzed to determine software application recommendations. Therefore, vendors may uncover user behavior patterns, learn the pattern demographics, and make sense of the interrelationships between the patterns and their demographics. This knowledge may help managers make better business strategies, leading to better services, and leading to better recommendations for users. Additionally, this problem solving framework is not constrained to analyzing the web clickstream data. It can be extended to deal with a broader class of categorical sequence data in many other fields.

In one or more embodiments, episode mining techniques may be employed. "Episode mining" refers to a data analysis process by which patterns are extracted from event log files. Episode mining may extract frequent patterns (episodes), such as user behavior patterns, from an event log file that contains users' activities with a system in a temporal order. Typical event log files include web server access logs, which maintain a history of page requests from users within a time period or session, call history logs from a call center, or the like. Enterprises or software vendors often desire to analyze event log files to discover valuable information, such as website traffic patterns or user activity patterns by time of day, time of week, time of year, and/or the like. Identified patterns may be used to generate episode rules to predict future events. In general, the event log file may be multiple orders of magnitude larger than the resulting identified patterns.

In one or more embodiments, association rule learning techniques may be employed. "Association rule learning" refers to a technique of data mining wherein data is collected without regard to the sequence in which the data is obtained. For example, in the instance of mining web click data, association rule learning may mine patterns (i.e., certain themes from webpages that are clicked), but does not record the sequence of webpages clicked. Thus, if page A, page B and page C are all clicked in one session and all relate to the same category of webpage, association rule learning assigns the same pattern value to the clicks, regardless of whether they appear in the order A-B-C, A-C-B, B-A-C, B-C-A, C-A-B or C-B-A. "Sequential pattern mining" works in a similar manner to that of association rule learning, but additionally records the sequence in which the data is obtained.

"Behavioral pattern mining" goes an additional step with sequential pattern mining by evaluating both the sequence of the obtained data, as well as relationships between the times in which the data was obtained. Thus, for example, groups of webpages are monitored for the sequence in which they are clicked, as well as the lengths of time between clicks. Thus, if page A, page B and page C are all clicked in the same session and all relate to the same category of webpage, then, for example, A-B------C is distinct from A-------B-C, wherein each dash refers to an elapsed time period between clicks. It is contemplated that a combination of these techniques (e.g., episode mining, association rule learning, sequential pattern mining, and behavioral pattern mining) may be used to create the user profiles to allow or permit the vendors to make appropriate or accurate or targeted software application recommendations to the users of, e.g., one or more social networks.

In one or more embodiments, behavior of users interacting with a web search engine may be automatically interpreted in order to predict future user preferences. Hence, the systems and methods described herein may adapt to changing user behavior patterns and different search settings by automatically retraining the systems and methods with the most recent user behavior patterns.

In one or more embodiments, the user profiles are used by the vendors to provide for targeted advertising, in addition to making personalized or customized or targeted recommendations. Therefore, vendors may advertise products and services that are triggered by behavioral patterns identified by behavior pattern engine.

Figure 8:
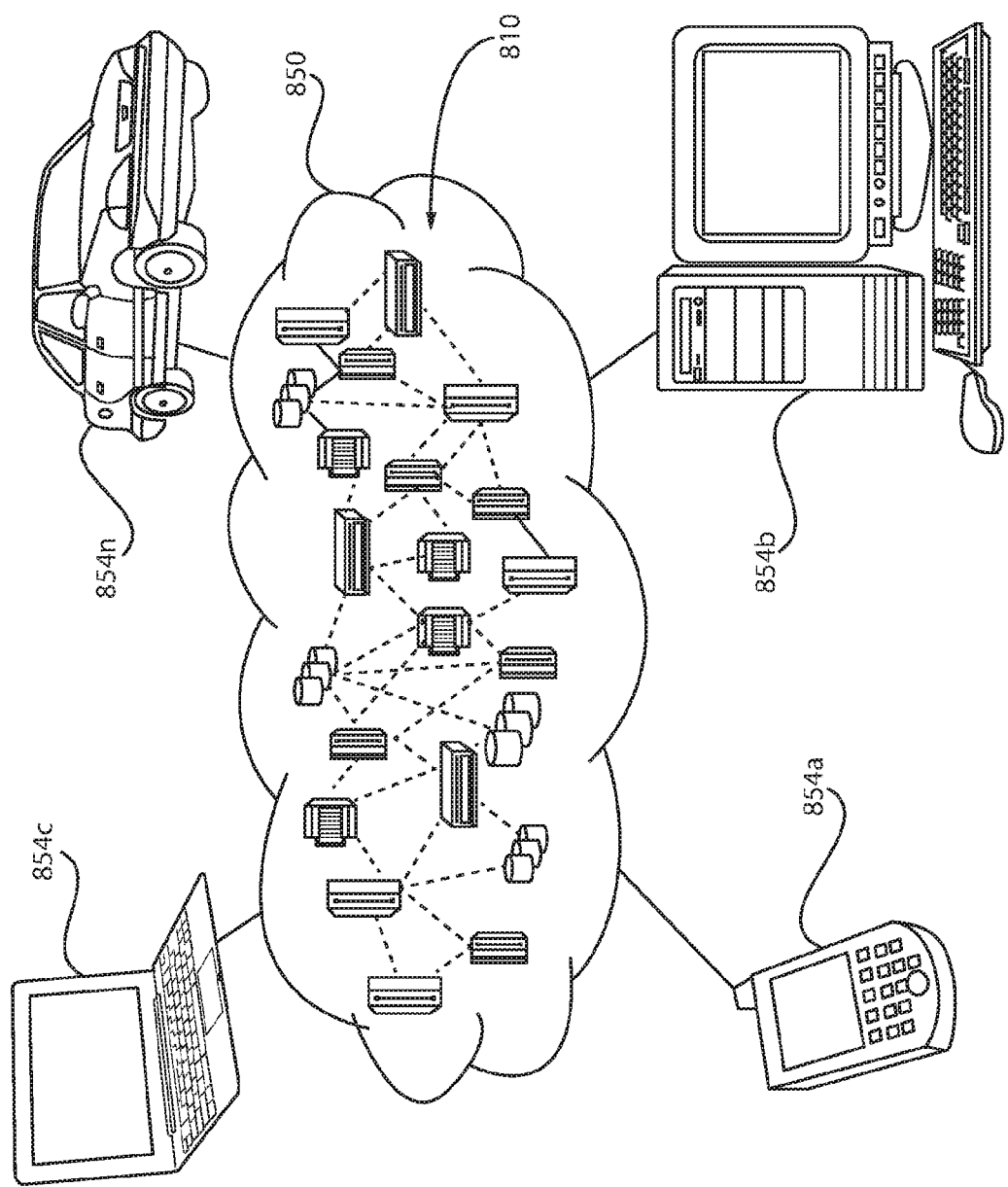
FIG. 8 is a block/flow diagram of an exemplary cloud computing environment, in accordance with an embodiment of the present principles.

FIG. 8 is a block/flow diagram of an exemplary cloud computing environment, in accordance with an embodiment of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 850 is depicted for recommending software applications to users connected to one or more social networks. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. The network may also be a network for recommending software applications to users. The network may be, e.g., a social network. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
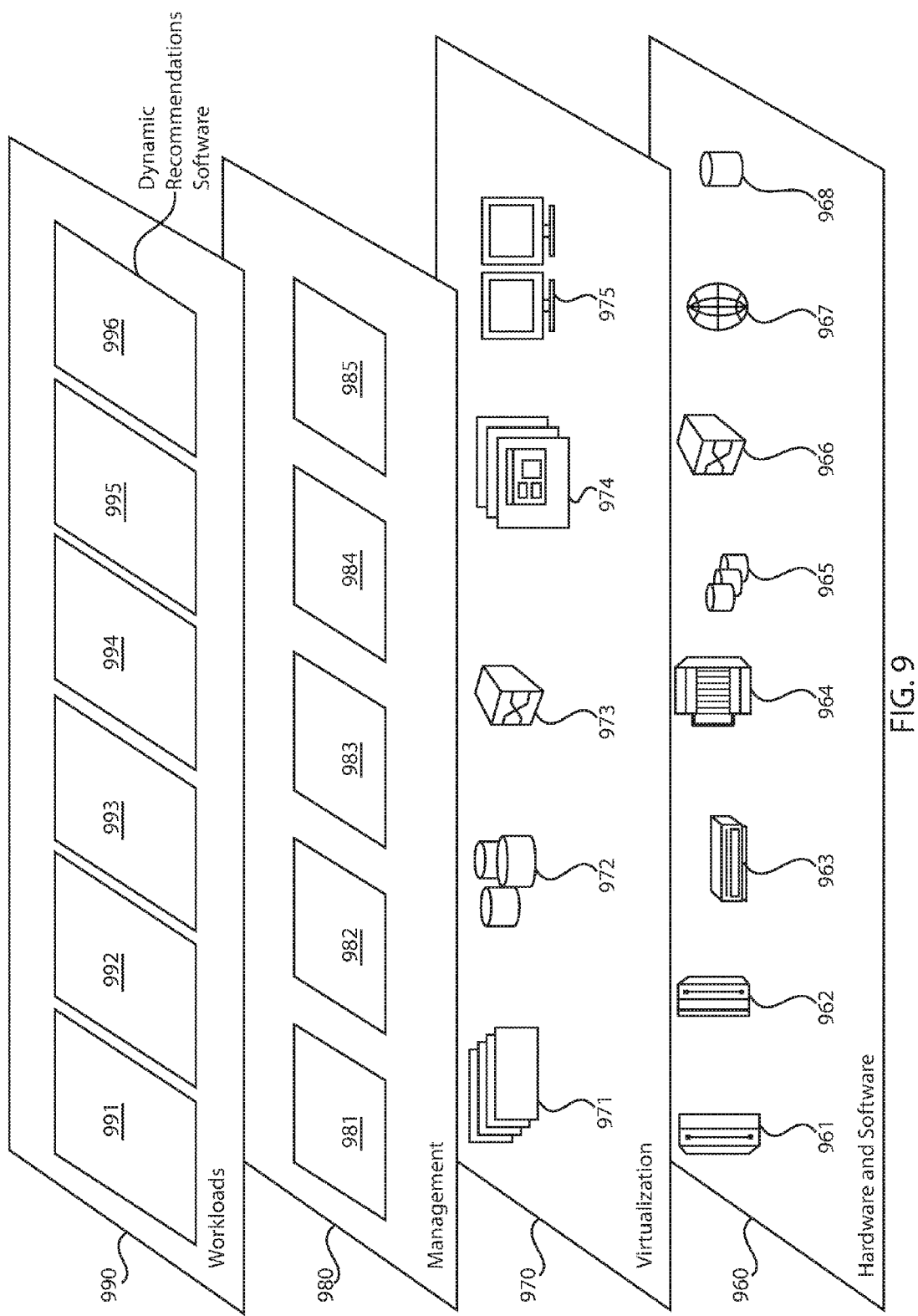
FIG. 9 is a schematic diagram of exemplary abstraction model layers, in accordance with an embodiment of the present principles.

FIG. 9 is a schematic diagram of exemplary abstraction model layers, in accordance with an embodiment of the present principles. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and dynamic recommendation software generation 996.

Still yet, any of the components of the present invention could be created, integrated, hosted, maintained, deployed, managed, serviced, etc. by a service supplier who offers to provide a method for recommending software applications based on skills and knowledge used to create a user profile. Thus, the present invention discloses a process for deploying, creating, integrating, hosting, maintaining, and/or integrating computing infrastructure, including integrating computer-readable code into the application recommendation computer system 100 (FIG. 1), wherein the code in combination with the application recommendation computer system 100 is capable of performing a method for recommending software applications. In another embodiment, the invention provides a business method that performs the process blocks/steps of the invention on a subscription, advertising, and/or fee basis. That is, a service supplier, such as a Solution Integrator, could offer to provide a method for recommending software applications. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for providing recommendations to users connected to one or more social networks, the method comprising:

determining frequency of interaction between the users logged in the one or more social networks based on at least event log data collected from device monitors;

analyzing behavioral patterns of the users logged in the one or more social networks, the behavioral patterns derived by considering at least the frequency of interaction between the users logged in the one or more social networks based on at least the event log data collected from the device monitors; and enabling at least one service provider to dynamically recommend software services and applications, by allowing the at least one service provider to automatically receive user pre-approved portions of a profile of each of the users, each profile derived from e behavioral patterns exhibited within the one or more social networks for each corresponding user longed therein, to a targeted group of users of the one or more of the users based on action, activity and common user role relationships of varying degrees of association exhibited within the one or more social networks and established between the targeted group of users and other groups of users logged in the one or more social networks.

2. The method of claim 1, wherein the at least one service provider is a software vendor.

3. The method of claim 1, further comprising allowing the at least one service provider to transmit ratings and reviews of the software services and applications to the targeted group of users.

4. The method of claim 1, further comprising associating the analyzed behavioral patterns to ratings of the software services and applications to the targeted group of users.

5. The method of claim 1, further comprising transmitting feedback to the at least one service provider related to the analyzed behavioral patterns of the targeted group of users.

6. The method of claim 1, wherein the profile for each of the users accessing the one or more social networks includes a behavioral profile.

7. The method of claim 6, further comprising continuously updating the behavioral profile for each of the users based on subsequent behavioral patterns detected.

8. The method of claim 1, further comprising analyzing the behavioral patterns by further considering groups and communities joined by one or more of the users.

9. The method of claim 1, further comprising analyzing the behavioral patterns by further considering software applications previously used or downloaded or accessed by one or more of the users.

10. A computer system for providing recommendations to users connected to one or more social networks, the computer system comprising:
    a memory; and
    a processor in communication with the memory, wherein the computer system is configured to:
        determine frequency of interaction between the users logged in the one or more social networks based on at least event log data collected from device monitors;
        analyze behavioral patterns of the users logged in the one or more social networks, the behavioral patterns derived by considering at least the frequency of interaction between the users logged in the one or more social networks based on at least the event log data collected from the device monitors; and
        enable at least one service provider to dynamically recommend software services and applications, by allowing the at least one service provider to automatically receive user pre-approved portions of a profile of each of the users, each profile derived from the behavioral patterns exhibited within the one or more social networks for each corresponding user logged therein, to a targeted group of users of the one or more of the users based on action, activity and common user role relationships of varying degrees of association exhibited within the one or more social networks and established between the targeted group of users and other groups of users logged in the one or more social networks.

11. The computer system of claim 10, wherein the at least one service provider is a software vendor.

12. The computer system of claim 10, further comprising allowing the at least one service provider to transmit ratings and reviews of the software services and applications to the targeted group of users.

13. The computer system of claim 10, further comprising associating the analyzed behavioral patterns to ratings of the software services and applications to the targeted group of users.

14. The computer system of claim 10, further comprising transmitting feedback to the at least one service provider related to the analyzed behavioral patterns of the targeted group of users.

15. The computer system of claim 10, wherein the profile for each of the users accessing the one or more social networks includes a behavioral profile.

16. The computer system of claim 15, further comprising continuously updating the behavioral profile for each of the users based on subsequent behavioral patterns detected.

17. The computer system of claim 10, further comprising analyzing the behavioral patterns by further considering groups and communities joined by one or more of the users.

18. The computer system of claim 10, further comprising analyzing the behavioral patterns by further considering software applications previously used or downloaded or accessed by one or more of the users.

19. A computer readable storage medium comprising a computer readable program for providing recommendations to users connected to one or more social networks, wherein the computer readable program when executed on a computer causes the computer to perform the steps of:
    determining frequency of interaction between the users logged in the one or more social networks based on at least event log data collected from device monitors;
    analyzing behavioral patterns of the users logged in the one or more social networks, the behavioral patterns derived by considering at least the frequency of interaction between the users logged in the one or more social networks based on at least the event log data collected from the device monitors; and
    enabling at least one service provider to dynamically recommend software services and applications, by allowing the at least one service provider to automatically receive user pre-approved portions of a profile of each of the users, each profile derived from the behavioral patterns exhibited within the one or more social networks for each corresponding user logged therein, to a targeted group of users of the one or more of the users based on action, activity and common user role relationships of varying degrees of association exhibited within the one or more social networks and established between the targeted group of users and other groups of users logged in the one or more social networks.

20. The computer readable storage medium of claim 19, wherein the method comprises:
    allowing the at least one service provider to transmit ratings and reviews of the software services and applications to the targeted group of users;
    associating the analyzed behavioral patterns to ratings of the software services and applications to the targeted group of users; and
    transmitting feedback to the at least one service provider related to the analyzed behavioral patterns of the targeted group of users.

* * * * *